United States Patent
Turkyilmaz et al.

(10) Patent No.: US 10,845,212 B1
(45) Date of Patent: Nov. 24, 2020

(54) GIANT MAGNETORESISTANCE STRAIN GAUGE SENSOR

(71) Applicant: Facebook Technologies, LLC, Menlo Park, CA (US)

(72) Inventors: Serol Turkyilmaz, Redmond, WA (US); Sean Jason Keller, Kirkland, WA (US); Tristan Thomas Trutna, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 311 days.

(21) Appl. No.: 15/868,859

(22) Filed: Jan. 11, 2018

(51) Int. Cl.
  *G01D 5/16* (2006.01)
  *G06F 3/01* (2006.01)
  *G01B 7/16* (2006.01)
(52) U.S. Cl.
  CPC ............ *G01D 5/16* (2013.01); *G01B 7/18* (2013.01); *G06F 3/014* (2013.01)
(58) Field of Classification Search
  CPC .............. G01D 5/16; G06F 3/014; G01B 7/18
  See application file for complete search history.

(56) References Cited

U.S. PATENT DOCUMENTS

| | | | | |
|---|---|---|---|---|
| 5,168,760 A | * | 12/1992 | Wun-Fogle | G01B 7/24 257/E43.005 |
| 2005/0164039 A1 | * | 7/2005 | Marinero | B82Y 25/00 428/832.2 |
| 2007/0139827 A1 | * | 6/2007 | Gao | B82Y 10/00 360/324.2 |
| 2012/0079887 A1 | * | 4/2012 | Giddings | G01B 7/24 73/779 |
| 2015/0306373 A1 | * | 10/2015 | Bouton | A61N 1/36003 607/48 |
| 2018/0303383 A1 | * | 10/2018 | Connor | G01B 7/22 |

* cited by examiner

*Primary Examiner* — Son T Le
*Assistant Examiner* — Adam S Clarke
(74) *Attorney, Agent, or Firm* — Fenwick & West LLP

(57) ABSTRACT

A strain gauge system includes a layered structure and a resistance sensor. The layered structure has an unstretched position and a range of stretched positions. The layered structure includes a multilayer thin film having alternating layers of ferromagnetic and non-ferromagnetic materials. The layered structure also includes a flexible magnet that produces a magnetic field. The resistance sensor measures a resistance of the multilayer thin film. The resistance of the multilayer thin film is lower when the layered structure is in the unstretched position than when it is in a stretched position in the range of stretched positions.

20 Claims, 5 Drawing Sheets

GIANT MAGNETORESISTANCE STRAIN GAUGE SENSOR

BACKGROUND

The present disclosure generally relates to a strain gauge sensor for identifying a bend in a material, and specifically relates to a strain gauge sensor that uses the giant magnetoresistance effect.

Bend sensing or flex sensing is an aspect of hand tracking which involves measuring the bends at the joints of a user's hand (e.g., the knuckles of one or more fingers and/or thumbs). The bends in the hand joints can be used to determine an overall position, or pose, of the user's hand. Hand tracking for virtual reality and/or augmented reality applications is emerging as an important feature. Current hand-tracking systems rely in inertial motion tracking or optical motion capture. Inertial motion tracking involves placing inertial sensors on a glove and using the inertial sensors to track rotations and determine hand movement or pose. Inertial motion tracking requires periodic recalibration, and materials in the environment can interfere with the function of the inertial sensors. Optical motion capture involves tracking using one or more cameras to capture images of the hand, and determining the position and pose of the hand from the images. In some cases, the user wears a glove with markers that are tracked. Optical motion capture requires the markers on the user's hand to be in the line of sight of the camera. Further, markers that are not visually distinct from each other can lead to inaccurate hand tracking, especially if a small proportion of the markers are visible to the camera.

Giant magnetoresistance (GMR) is a quantum mechanical magnetoresistance effect observed in multilayers composed of alternating ferromagnetic and non-magnetic conductive layers. The GMR effect is observed as a significant change in the electrical resistance of the multilayers whether the ferromagnetic layers are in parallel or antiparallel alignment. In particular, if the ferromagnetic layers have a parallel alignment, the resistance is relatively low, and if the ferromagnetic layers have an anti-parallel alignment, the overall resistance is relatively high. Applying a magnetic field to the multilayers creates a parallel alignment.

SUMMARY

A strain gauge system that can be used to determine whether a material is stretched or unstretched is described. The strain gauge system may be incorporated into a wearable garment (e.g., a glove), and can be used to determine that a joint of a wearer is in a bent position based on detecting a stretch in the material. The strain gauge system is based on the giant magnetoresistance (GMR) effect. Due to the GMR effect a relatively strong magnetic field applied to the multilayer results in the multilayer having a relatively low resistance. And conversely, a relatively weak magnetic field applied to the multilayer results in the multilayer having a relatively high resistance. By arranging the multilayer and a magnet such that the magnet creates a high magnetic field in the multilayer in one position of the strain gauge system (e.g., an unbent or unstretched position), and the magnet creates a low magnetic field in another position of the strain gauge system (e.g., a bend or stretched position), a measurement of the resistance of the multilayer can be used to identify the position of the strain gauge system.

In some embodiments, a strain gauge system including a layered structure and a resistance sensor is described herein. The layered structure has an unstretched position and a range of stretched positions. The layered structure includes a multilayer thin film having alternating layers of ferromagnetic and non-ferromagnetic materials. The layered structure also includes a flexible magnet that produces a magnetic field. The resistance sensor measures a resistance of the multilayer thin film. The resistance of the multilayer thin film is lower when the layered structure is in the unstretched position than when it is in a stretched position in the range of stretched positions.

In alternate embodiments, a strain gauge system includes a stretchable structure and a resistance sensor. The stretchable structure includes a multilayer thin film and a magnet. The multilayer thin film includes alternating layers of ferromagnetic and non-ferromagnetic materials. The magnet produces a magnetic field, which has a first field strength within the multilayer thin film in an unstretched position of the stretchable structure, and a second field strength within the multilayer thin film in a stretched position of the stretchable structure. The second field strength in the stretched position is lower than the first field strength in the unstretched position. The resistance sensor measures a resistance of the multilayer thin film. The resistance of the multilayer thin film is related to a field strength of the magnetic field within the multilayer thin film. In some embodiments, the multilayer thin film and the magnet are positioned proximate to each other when the stretchable structure is in the unstretched position, and are either unaligned or pulled apart from each other when the stretchable structure is in the stretched position.

Figure 1:
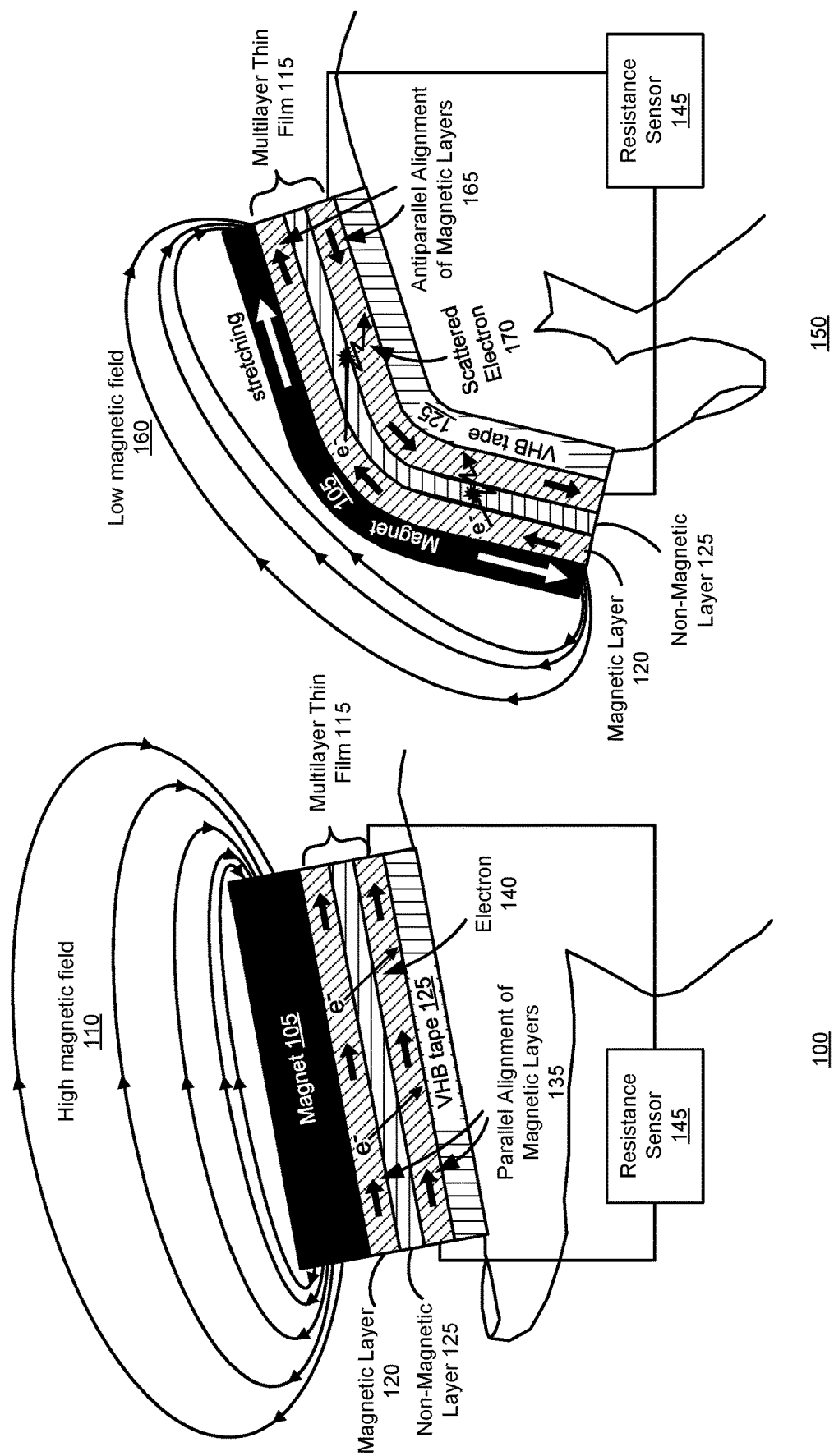
FIG. 1 is a cross section diagram of a strain gauge system in an unstretched position and a stretched position, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

A strain gauge system described herein includes a layered structure that includes a flexible magnet and a multilayer thin film with alternating layers of ferromagnetic and non-ferromagnetic materials. When the layered structure is in an unstretched position, the flexible magnet is straight and relatively thick, creating a magnetic field with a high magnetic field strength that aligns the magnetization of the ferromagnetic layers in the multilayer thin film. When the layered structure is in a stretched position, the stretching changes the geometry of the flexible magnet: it bends and become thinner. The magnet of the layered structure in the stretched position creates a lower-strength magnetic field that does not align the magnetization of the ferromagnetic layers. The GMR effect causes a multilayer with aligned ferromagnetic layers to have a lower resistance than a multilayer with non-aligned ferromagnetic layers. A resistance sensor in the strain gauge system measures the resistance of the multilayer thin film, which indicates whether the layered structure is in the unstretched position or a stretched position.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

In artificial reality systems, hand tracking and gesture recognition can be used for user input. For example, the artificial reality system can recognize known gestures and respond accordingly. As described herein, the artificial reality system can determine the position of the glove based on measurements of bends of finger and hand joints detected using strain gauge sensors on a trackable glove. This allows more accurate determination of a hand position compared to prior techniques, and enables determination of position even if the glove is not in the direct line of sight of a receiver.

FIG. 1 is a cross section diagram of a strain gauge system in an unstretched position 100 and a stretched position 150, in accordance with one or more embodiments. The strain gauge system includes a magnet 105, a multilayer thin film 115, and a resistance sensor 145. The magnet 105 is a flexible magnet that produces a magnetic field. The magnet 105 may be a high-coercivity ferromagnetic compound, such as ferric oxide, which is mixed with a flexible plastic binder. The magnetic compound may be powdered or granular, or may be formed into larger magnetic segments bound by a flexible material. In some embodiments, rare-earth magnetic materials may be used. In the unstretched position 100, the magnet 105 generates a high magnetic field 110 of a first field strength, and in the stretched position 150, the magnet 105 generates a low magnetic field 160 of a second field strength that is lower than the first field strength. The first field strength typically is within a range of 20-40 Oersted and the second field strength typically is within in a range of 5-20 Oersted. However, in some embodiments, the strain gauge system may be designed to use other values of the first field strength and second field strength.

The high magnetic field 110 applied to the multilayer thin film 115 causes the multilayer thin film 115 to have a relatively low resistance, and the low magnetic field 160 applied to the multilayer thin film 115 causes the multilayer thin film 115 to have a relatively high resistance. The resistance sensor 145 induces a current or voltage difference through the multilayer thin film 115 and measures a resistance of the multilayer thin film 115. As described in detail below, components of the strain gauge system are arranged such that a resistance of the multilayer thin film 115 that is below a threshold resistance value indicates that the multilayer thin film 115 is in the unstretched position 100. And a resistance of the multilayer thing film 115 that is above the threshold value indicates that the multiplayer thin film 115 is in a stretched position 150. This difference in resistance is caused by the GMR effect. The threshold resistance value is typically around or on the order of 100 ohms. However, in some embodiments, the strain gauge system may be designed such that the threshold resistance has some other value.

While only one stretched position 150 is shown, the strain gauge system can exhibit a range of stretched positions, e.g., corresponding to different degrees of bending of a finger or other joint. Accordingly, there is a range of corresponding resistance values that map to each of the stretched positions. It should be understood that the elements of FIG. 1 are not drawn to scale; for example, in an actual device, the multilayer thin film 115, VHB tape 125, and magnet 105 would be thinner than depicted in FIG. 1, and the resistance sensor 145 would be likely incorporated into a garment and not separated from the multilayer thin film 145 and magnet 105, as shown in FIG. 1.

The multilayer thin film 115 includes magnetic layers 120 and non-magnetic layers 125. The magnetic layers 120 may include a ferromagnetic material, such as permalloy, which is a nickel-iron magnetic alloy. The non-magnetic layers 125 may include a non-ferromagnetic material, such as copper. The magnetic layers 120 and non-magnetic layers 125 may be on the order of a nanometer in thickness. While only two magnetic layers 120 and one non-magnetic layer 125 are shown in FIG. 1, the multilayer thin film 115 may include more alternating layers, e.g., up to 100 layers each of magnetic layers 120 and non-magnetic layers 125. In one particular embodiment, the multilayered thin film is composed of $Py(1.9 \text{ nm})/[Cu(2 \text{ nm})/Py(1.6 \text{ nm})]_{40}$. The magnet 105 and the multilayered thin film 115 can be considered a single layered structure.

The resistance sensor 145 detects resistance within the multilayer thin film 115, e.g., by inducing an electric current in the multilayer thin film 115 and measuring the voltage drop across the multilayer thin film 115. The resistance sensor 145 can apply an electric current that passes through the multilayer thin film 115 in a direction parallel to the magnetic layers 120 and non-magnetic layers 125 (current in plane, or CIP geometry) or perpendicular to the magnetic layers 120 and non-magnetic layers 125 (current perpendicular to plane, or CPP geometry). The GMR effect is generally stronger in the CPP geometry than in the CIP geometry, but it is detectable in both directions.

The multilayer thin film 115 is formed on a VHB (very high bond) tape 125. The VHB tape 125 acts a flexible substrate for the multilayer thin film 115; the multilayer thin film 115 is positioned atop the flexible substrate, and the magnet 105 is positioned atop the multilayer thin film 115. The VHB tape 125 can be used to adhere the multilayer thin film 115 to a garment (not shown), e.g., a glove digits or portions of a glove digits corresponding to a wearer's knuckle. In other embodiments, alternate materials can be used as the base of the strain gauge system and/or to attach the strain gauge system to a garment. In some embodiments, the multilayer thin film 115 is formed on a layer of polyimide (PI) or other polymer and then attached to the VHB tape 125, as described with respect to FIG. 2. As shown in FIG. 1, in the unstretched position 100, the layered structure including the magnet 105 and the multilayer thin film 115 is substantially planar along a plane extending into the page and in the direction of the electrons 140. The multilayer thin film 115 itself is substantially planar and is oriented within the same plane as the layered structure.

The magnet 105 produces a high magnetic field 110 of a first field strength around the magnet 105. The high magnetic field 110 extends both above the magnet 105, as depicted in FIG. 1, and below the magnet 105 and into the multilayer thin film 115. To simplify the drawing, the portion of the high magnetic field 110 that is applied to the multilayer thin film 115 is not shown in FIG. 1. The high magnetic field 110 causes parallel alignment of the magnetic layers 135, which is depicted by arrows within the magnetic layers 120 pointing in the same direction. When an electrical current is applied to the multilayer thin film 115 by the resistance sensor 145, the parallel alignment of the magnetic layers 135 allows electrons 140 to pass through the multilayer thin film 115, which results in a resistance measurement at the resistance sensor 145 that is below the threshold resistance.

More particularly, electrons have an associated spin direction: up or down. Up electrons tend to be scattered by magnetic layers 120 with one magnetization direction, and down electrons tend to be scattered by magnetic layers 120 with the opposite magnetization direction. If the multilayer thin film 115 has parallel alignment of magnetic layers 135, the up electrons tend to be scattered, while the down electrons tend not to be scattered (or the up electrons tend not be scattered while the down electrons are scattered, depending on the direction of magnetization). Thus, many of the electrons 140 (i.e., either the up electrons or the down electrons, depending on the direction of magnetization) are able to pass through the multilayer thin film 115 with parallel alignment of magnetic layers 135.

When the strain gauge system is in the stretched position 150, the geometry of the magnet 105 is different. The magnet 105 is stretched, causing it to be thinner, and it is bent. The stretching of the magnet 105 results in a low magnetic field 160 of a second field strength that is lower than the first field strength. More particularly, the strength of the low magnetic field 160 is low relative to the magnetic field strength of the high magnetic field 110 created in the unstretched position 100. While the low magnetic field 160 also extends below the magnet 105, the magnet 105 in the stretched position 150 does not apply a strong enough magnetic field to align the magnetic layers 120. Instead, the low magnetic field 160 causes antiparallel alignment of the magnetic layers 165, which is depicted by arrows within the magnetic layers 120 pointing in opposite directions. In some embodiments, a portion of the magnetic layers 120 are in parallel alignment (e.g., the magnetic layers closer to the magnet 105), while other magnetic layers 120 are in antiparallel alignment (e.g., the magnetic layers farther from the magnet 105).

When the resistance sensor 145 applies an electrical current to the multilayer thin film 115, the antiparallel alignment of the magnetic layers 165 causes scattered electrons 170 that do not pass through the multilayer thin film 115. This scattering causes a measurement of the resistance value by the resistance sensor 145 to be above the threshold resistance value, indicating that the multilayer thin film 115 is in the stretched position 150. By contrast, when the multilayer thin film 115 is in the unstretched position 100, the resistance value measured by the resistance sensor 145 is below the threshold resistance value. In particular, when up electrons encounter an antiparallel alignment of the magnetic layers 165, the up electrons tend to be scattered by magnetic layers 120 with one magnetization direction, and down electrons tend to be scattered by magnetic layers 120 with the opposite magnetization direction. Since the multilayer thin film 115 in the stretched position 150 has magnetic layers 120 of both magnetization directions, the up electrons tend to be scattered by the magnetic layers 120 with one magnetization direction, while the down electrons tend to be scattered by magnetic layers 120 with the other magnetization direction. Accordingly, more of the electrons 170 are scattered by the antiparallel alignment of magnetic layers 165 than with the parallel alignment of magnetic layers 135. This results in a measured resistance that is above the threshold resistance value.

In some embodiments, the degree of bending is correlated with the resistance of the multilayer thin film 115. In particular, a higher degree of bending stretches the magnet 105 further and creates a weaker magnetic field, which results in a higher resistance within the multilayer thin film 115. On the other hand, a small degree of bending produces less stretch in the magnet 105 and still creates a relatively high magnetic field, which results in a lower resistance within the multilayer thin film 115. In this embodiment, the measurement of the resistance of the multilayer thin film can be used to determine a degree of bending in the joint of the user.

In some embodiments, one or more strain gauge systems are incorporated into a wearable garment that can be worn by a user. Each strain gauge system is positioned in the garment at a position that corresponds to a joint of the user. For example, multiple strain gauge systems, each including a magnet 105, multilayer thin film 115, and resistance sensor 145, can be incorporated into a glove and each positioned at a different knuckle of a user's finger or thumb. All of the detected bend degrees can be used to determine an overall pose of the user's hand or portion of the user's hand.

Figure 2:
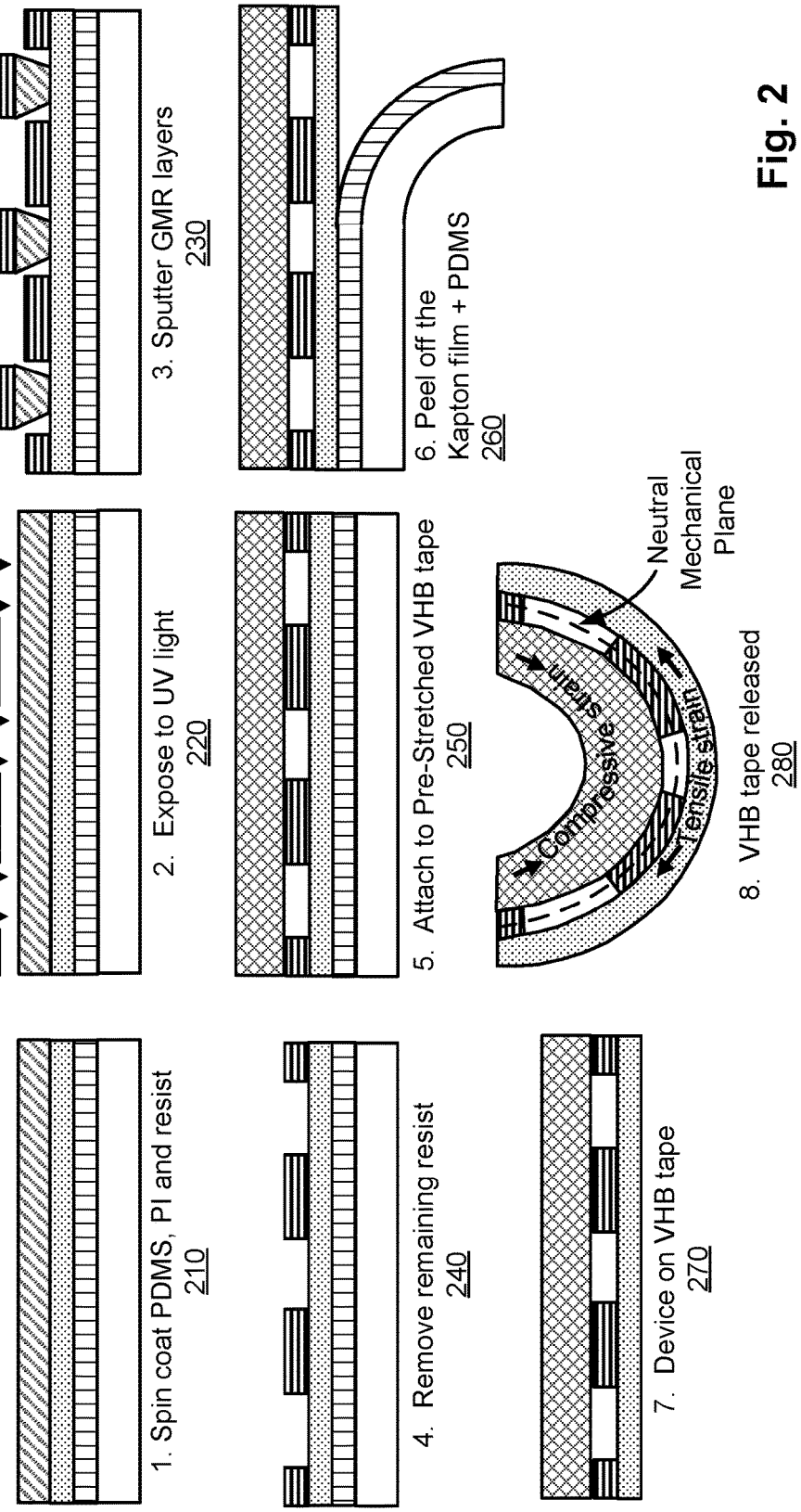
FIG. 2 illustrates a microfabrication process flow for fabricating a layered structure for a strain gauge system, in accordance with one or more embodiments.

FIG. 2 illustrates a microfabrication process flow for fabricating a layered structure for a strain gauge system, in accordance with one or more embodiments. The microfabrication process flow results in the multilayer thin film 115 mounted on VHB tape 125 shown in FIG. 1. A legend 200 identifies the materials used in the microfabrication process. PI is an abbreviation for polyimide, and PDMS is an abbreviation for polydimethylsiloxane. The resist is a light-sensitive resist, or photoresist.

The first step 210 of the microfabrication process flow is to spin coat PDMS on a KAPTON film, spin coat PI atop the PDMS, and spin coat a photoresist atop the PI.

At 220, the photoresist is exposed to ultraviolet (UV) light through a photomask to pattern the photoresist. A developer is used to remove the unexposed resist, leaving the resist that was exposed to the UV light on the PI.

At step 230, GMR (giant magnetoresistance) layers, which are the alternating magnetic layers 120 (e.g., layers of permalloy) and non-magnetic layers 125 (e.g., layers of copper) described with respect to FIG. 1, are sputtered on the exposed surfaces. The GMR layers are sputtered on both the exposed portions of the PI where the resist was removed and the remaining resist.

At step 240, the remaining photoresist, and the GMR layers sputtered on the photoresist, is removed from the PI, leaving the GMR layers that were sputtered on the exposed portions of the PI.

At step 250, the assembly is attached to a pre-stretched VHB tape, which is layered atop of the remaining GMR layers.

At step 260, the KAPTON film and PDMS on are peeled off from the PI. This results in the finished device on the VHB tape, shown at step 270. The device includes the alternating magnetic and non-magnetic layers and the layer of PI.

At step 280, the VHB tape is released from its pre-stretched position. This compresses the VHB tape side of the device, and strains the PI side of the device. The alternating magnetic and non-magnetic layers are still in a neutral mechanical plane. Releasing the VHB tape results bunches up the device in its unstretched position, and allows the device to be stretched when it is applied to a bendable garment.

Figure 3:
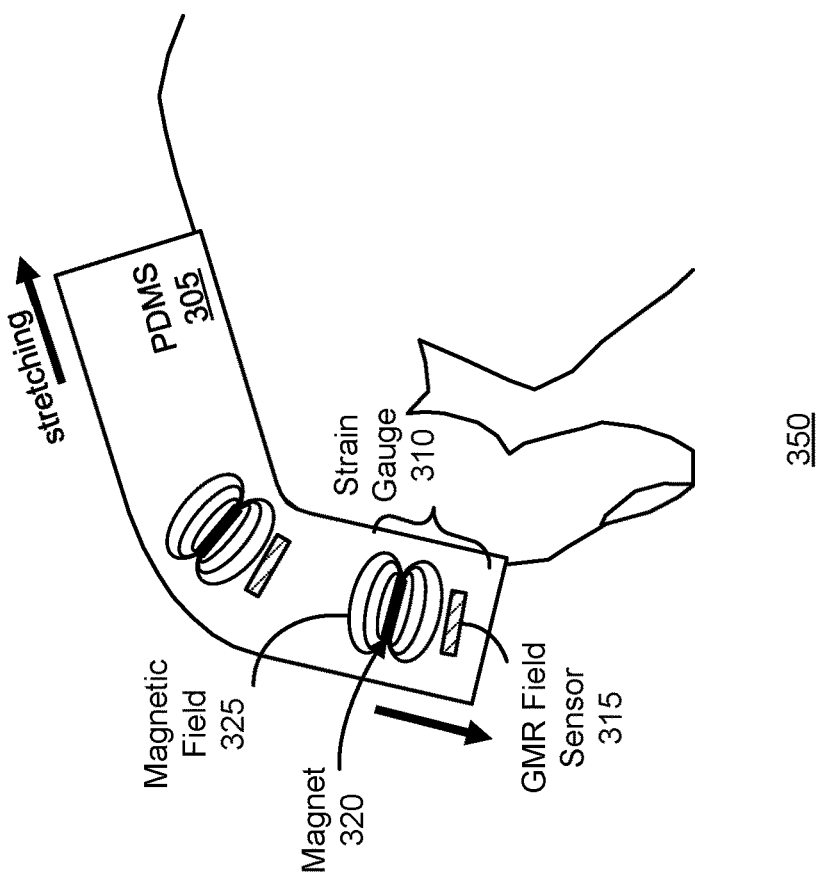
FIG. 3 is a cross section diagram of a first alternate strain gauge system in an unstretched position and a stretched position, in accordance with one or more embodiments.
Figure 3:
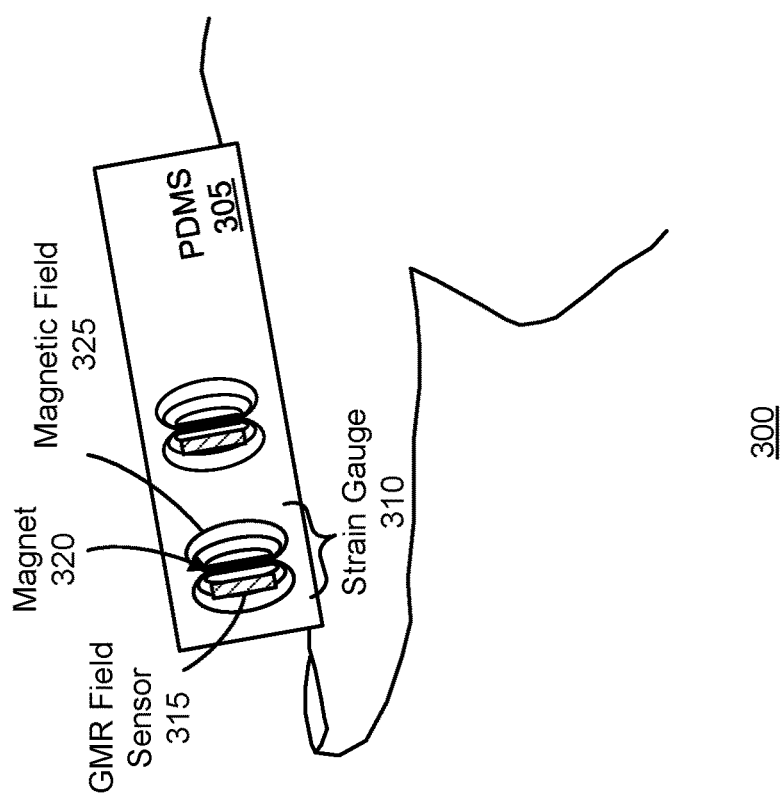
Figure 4:
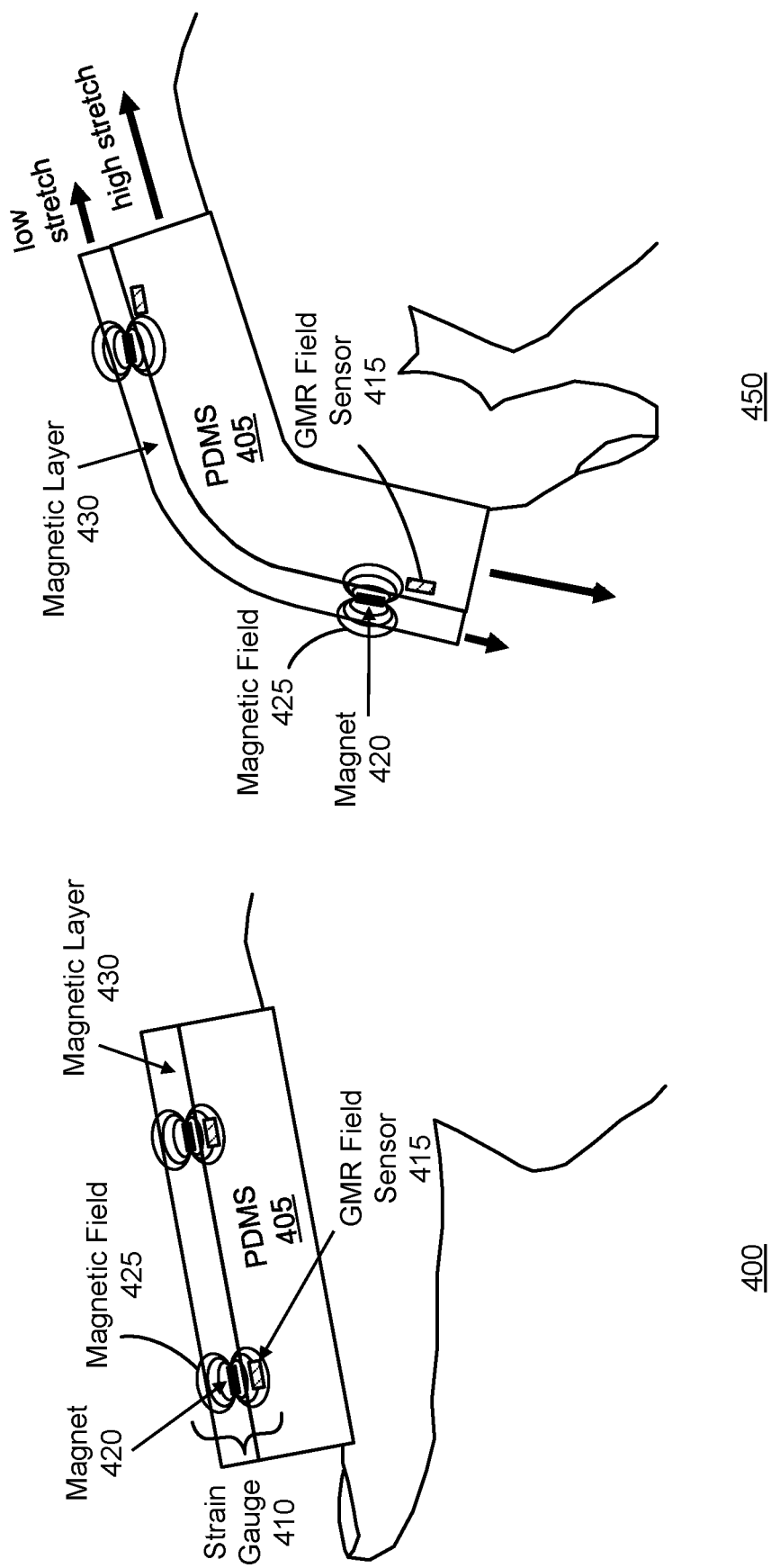
FIG. 4 is a cross section diagram of a second alternate strain gauge system in an unstretched position and a stretched position, in accordance with one or more embodiments.

FIGS. 3 and 4 show two alternate strain gauge systems in unstretched and stretched positions. Unlike the strain gauge system shown in FIG. 1, which uses a flexible magnet 105, the alternate strain gauge systems shown in FIGS. 3 and 4 use rigid magnets that produce the same magnetic field in the unstretched and stretched positions. However, based on the relative positions of a multilayer thin film and the magnet in the alternate strain gauge systems, the strength of the magnetic field applied to the multilayer thin film varies between the unstretched position and stretched positions. In particular, because of the multilayer thin film and magnet pulling away from each other in the stretched position (as in FIG. 3), or becoming unaligned in the stretched position (as in FIG. 4), the strength of the field within the multilayer thin film is lower in a stretched position than in the unstretched position. A stretch or bend in the alternate strain gauge systems can be detected by measuring a resistance of the multilayer thin film, which is related to a field strength of the magnetic field within the multilayer thin film.

FIG. 3 is a cross section diagram of a first alternate strain gauge system in an unstretched position 300 and a stretched position 350, in accordance with one or more embodiments. The strain gauge system includes multiple strain gauges 310. The strain gauges 310 are embedded into a stretchable structure formed of PDMS 305 or another elastic material. Each strain gauge 310 includes a GMR field sensor 315 and a magnet 320, which produces an electric field 325. Each GMR field sensor 315 includes a multilayer thin film and a resistance sensor, which operate according to the same principles as the multilayer thin film 115 and resistance sensor 145 described with respect to FIG. 1. The magnet 320 is a rigid magnet, and the magnetic field 325 produced by the magnet 320 does not vary between the unstretched position 300 and the stretched position 350. Instead, the effect of the magnetic field 325 on the GMR field sensor 315 varies based on the relative position of the magnet 320 and the GMR field sensor 315, which changes between the unstretched position 300 and the stretched position 350. In particular, in the unstretched position 300, the magnet 320 is close to the GMR field sensor 315 and applies a magnetic field of a first field strength to the GMR field sensor 315; in the stretched position 350, the magnet 320 is farther away from the GMR field sensor 315 and applies a magnetic field of a second field strength to the GMR field sensor 315. The first field strength is higher than the second field strength.

As shown in FIG. 3, the stretchable structure (e.g., the PDMS 305) in the unstretched position is substantially planar along a plane that extends into the page and along the finger from knuckle towards fingertip. In the stretched position 350, the stretchable structure is no longer planar. In the unstretched position 300, the GMR field sensor 315, and the multilayer thin film included in the GMR field sensor 315, are embedded in the PDMS 305 with an orientation perpendicular to a plane of the stretchable structure. The magnet 320 is also embedded in the PDMS 305 with an orientation perpendicular to the plane of the stretchable structure in the unstretched position 300. The multilayer thin film in the GMR field sensor 315 and the magnet 320 are oriented generally parallel to each other. In the unstretched position 300, the GMR field sensor 315 (and thus the multilayer thin film) and the magnet 320 are a short distance apart, and in the stretched position 350, the multilayer thin film and the magnet 320 are a longer distance apart.

As described with respect to FIG. 1, a magnetic field of a first field strength applied to a multilayer thin film in the unstretched position causes a resistance below a threshold value in the multilayer thin film, while a magnetic field of a second field strength, lower than the first field strength, applied to the multilayer thin film creates a resistance above the threshold value in the multilayer thin film. To measure the resistance of the multilayer thin film, a resistance sensor in the GMR field sensor 315 induces a current through the multilayer thin film and measures its resistance, which indicates whether the strain gauge 310 is in the unstretched position 300 (resistance measurement below the threshold, caused by parallel alignment of the ferromagnetic layers) or stretched position 350 (resistance measurement above the threshold, caused by antiparallel alignment of ferromagnetic layers). While only one stretched position 350 is shown, the strain gauge system can exhibit a range of stretched positions, e.g., corresponding to different degrees of bending of a finger or other joint.

It should be understood that the elements of FIG. 3 are not drawn to scale; for example, in an actual device, the PDMS 305 structure would be thinner than depicted, and the strain gauges 310 would be smaller.

FIG. 4 is a cross section diagram of a second alternate strain gauge system in an unstretched position 400 and a stretched position 450, in accordance with one or more embodiments. The strain gauge system includes multiple strain gauges 410. The strain gauges 410 are embedded into a stretchable structure formed of two layers with different elasticities. For example, a layer of PDMS 405 has a higher elasticity than a flexible magnet layer 430. Each strain gauge 410 includes a GMR field sensor 415 embedded in the PDMS 405, and a magnet 420, which produces an electric field 425. As shown in FIG. 4, the magnet 420 is embedded in the magnetic layer 430; the magnetic layer 430 may be a flexible material, such as a plastic, in which individual magnets 420 are embedded. The GMR field sensor 415 is embedded in the layer of PDMS 405. In other embodiments, the positions of the PDMS 405 with the GMR field sensor 415 and the magnetic layer 430 with the magnet 420 are reversed.

Each GMR field sensor 415 includes a multilayer thin film and a resistance sensor, which operate according to the same principles as the multilayer thin film 115 and resistance sensor 145 described with respect to FIG. 1. The magnetic field 425 produced by the magnet 420 does not vary between the unstretched position 400 and the stretched position 450. Instead, the effect of the magnetic field 425 on the GMR field sensor 415 varies based on the relative position of the magnet 420 and the GMR field sensor 415, which changes between the unstretched position 400 and the stretched position 450. In particular, in the unstretched position 400, the magnet 420 is aligned with the GMR field sensor 415 and applies a high magnetic field to the GMR field sensor 415; in the stretched position 450, the magnet 420 and the GMR field sensor 415 are unaligned, and the magnet 420 applies a low magnetic field to the GMR field sensor 415. The misalignment between the magnet 420 and the GMR field sensor 415 in the stretched position 450 is caused by the different elasticities of the PDMS 405 and the magnetic layer 430. As indicated in FIG. 4, in the stretched position 450, the PDMS 405 has a high amount of stretch, and the magnetic layer 430 has a low amount of stretch.

As shown in FIG. 4, the stretchable structure (e.g., the PDMS 405 and the magnetic layer 430) in the unstretched position is substantially planar along a plane that extends into the page and along the finger from knuckle towards fingertip. In the unstretched position 400, the GMR field sensor 415, and the multilayer thin film included in the GMR field sensor 415, is embedded in the PDMS 405 with an orientation parallel to the plane of the stretchable structure. The magnet 420 is embedded in the magnetic layer 430 with an orientation parallel to the plane of the stretchable structure. The multilayer thin film in the GMR field sensor 415 and the magnet 420 are oriented generally parallel to each other. In the unstretched position 400, the GMR field sensor 415 (and thus the multilayer thin film) and the magnet 420 are aligned, and in the stretched position 450, the multilayer thin film and the magnet 420 are unaligned with the magnet 420 offset from the GMR field sensor 415.

As described with respect to FIG. 1, a magnetic field of a first field strength applied to a multilayer thin film in the unstretched position causes a resistance below a threshold value in the multilayer thin film, while a magnetic field of a second field strength, lower than the first field strength, applied to the multilayer thin film creates a resistance above the threshold value in the multilayer thin film. To measure the resistance of the multilayer thin film, a resistance sensor in the GMR field sensor 415 induces a current through the multilayer thin film and measures its resistance, which indicates whether the strain gauge 410 is in the unstretched position 400 (resistance measurement below the threshold, caused by parallel alignment of the ferromagnetic layers) or stretched position 450 (resistance measurement above the threshold, caused by antiparallel alignment of ferromagnetic layers). While only one stretched position 450 is shown, the strain gauge system can exhibit a range of stretched positions, e.g., corresponding to different degrees of bending of a finger or other joint.

It should be understood that the elements of FIG. 4 are not drawn to scale; for example, in an actual device, the stretchable structure would be thinner than depicted, and the strain gauges 410 would be smaller.

In the embodiments shown in FIGS. 3 and 4, any number of strain gauges 310 or 410 may be embedded in stretchable structure (e.g., the PDMS 305 or the PDMS 405 and 430) and included in the strain gauge system. In some embodiments, the strain gauge system shown in FIG. 3 or 4 is incorporated into a garment that can be worn by a user at a position in the garment corresponding to a joint of the user. The stretched position 350 or 450 corresponds to a bend in the joint. For example, if the garment is a wearable glove, a strain gauge 310 or 410 can located at a particular joint on a user's finger, or multiple strain gauges 310 or 410 can included at a single joint or along a single finger. The strain gauge 310 or 410, or set of strain gauges 310 and/or 410, within a single glove digit can measure the amount of bend in the glove digit of the wearable glove. While the strain gauge systems are shown positioned on the dorsal side of a user's hand in FIGS. 1, 3, and 4, it should be understood that any of the strain gauge systems described herein may be additionally or alternatively positioned on the palmar side of a user's hand, or at any other position of a user's body.

In some embodiments, the stretchable structure has a range of stretched positions, and the resistance of the multilayer thin film detected at the GMR field sensor 315 or 415 varies over the range of stretched positions. In such embodiments, the measurement of the resistance of the multilayer thin film can be used to determine a degree of bending in the joint of the user.

The multilayer thin films of the GMR field sensors 315 and 415 may be fabricated using a modified version of the process shown in FIG. 2. In embodiments where the GMR field sensors 315 and 415 are not flexible, alternating magnetic and non-magnetic layers can be sputtered onto a substrate, such as PI, and optionally coated with unstretched VHB tape, another layer of PI, or another material before being embedded into the stretchable structure.

Figure 5:
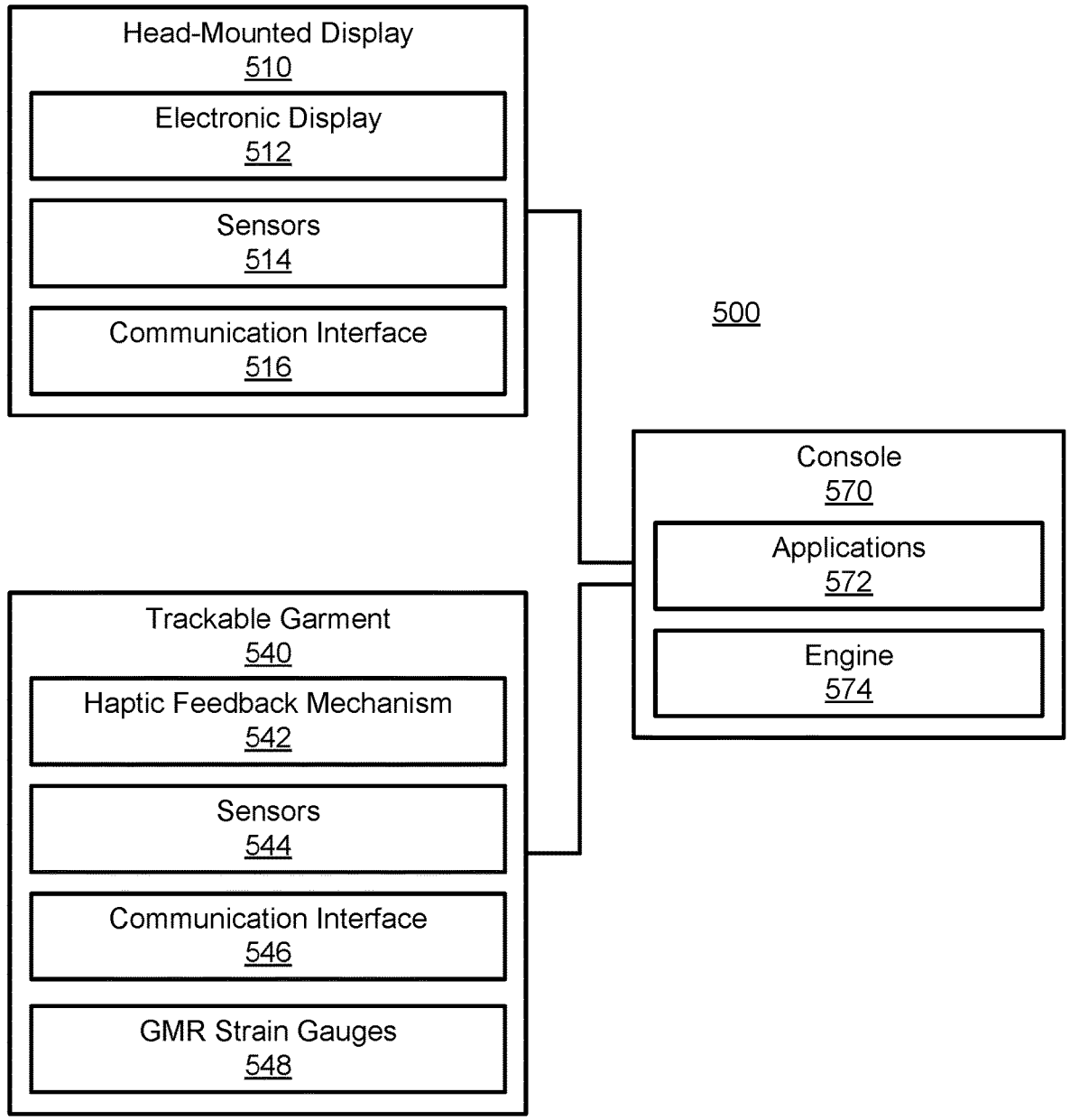
FIG. 5 is a block diagram of a system environment for a hand tracking garment, in accordance with one or more embodiments.

FIG. 5 is a block diagram of a system environment 500 in which a trackable garment 540 operates, in accordance with one or more embodiments. The system environment 500 may be, for example, an artificial reality system. In some embodiments, the system environment 500 is capable of alternating between operating as a VR, an MR, and an AR system, or some subset thereof. The system environment 500 shown in FIG. 1 comprises a head-mounted display (HMD) 510 and a trackable garment 540 that are both coupled to a console 570. While FIG. 5 shows an example system environment 500 including one HMD 510 and one trackable garment 540, in other embodiments any number of these components may be included in the system environment 500. For example, the system environment 500 may include two trackable garments 540 (e.g., one glove for each hand) that are worn by the same user. As another example, the system environment 500 may include multiple trackable garments 540 intended to be worn by multiple users, with each trackable garment 540 or each pair of trackable garments 540 associated with a different HMD 510. In alternative configurations, different or additional components may be included in the system environment 500.

The HMD 510 is a head-mounted display that presents media to a user. Examples of media presented by the HMD 510 include images, video, audio, or some combination thereof. In some embodiments, audio is presented via an external device (e.g., speakers or headphones) that receives audio information from the HMD 510, the console 570, or both, and presents audio data based on the audio information. In some embodiments, the HMD 510 may also act as an AR and/or MR headset. In these embodiments, the HMD 510 augments views of a physical, real-world environment with computer-generated elements (e.g., images, video, sound, etc.).

The HMD 510 includes an electronic display 512, sensors 514, and a communication interface 516. Some embodiments of the HMD 510 have different components than those described here. Similarly, the functions can be distributed among the components in a different manner than is described here.

The electronic display 512 displays images to the user in accordance with data received from the console 570. In various embodiments, the electronic display 512 may comprise a single electronic display 512 or multiple electronic displays 512 (e.g., one display for each eye of a user).

The sensors 514 include one or more hardware devices that detect spatial and motion information about the HMD 510. Spatial and motion information can include information about the position, orientation, velocity, rotation, and acceleration of the HMD 510. For example, the sensors 514 may include a gyroscope that detects rotation of the user's head while the user is wearing the HMD 510. This rotation information can then be used (e.g., by the engine 574) to adjust the images displayed on the electronic display 512.

The communication interface 516 enables input and output to the console 570. In some embodiments, the communication interface 516 is a bus, such as High-Definition Multimedia Interface (HDMI), Universal Serial Bus (USB), Video Graphics Array (VGA), Digital Visual Interface (DVI), DisplayPort™, or some combination thereof. In other embodiments, the communication interface 516 includes several distinct communication buses operating together or independently. In one embodiment, the communication interface 516 includes wireless connections for sending data collected by the sensors 514 from the HMD 510 to the console 570 but also includes a wired connection (e.g., an HDMI or DVI connection) that receives audio/visual data to be rendered on the electronic display 512.

The trackable garment 540 is a trackable wearable device. The trackable garment 540 may be configured to be worn on a portion of a user's body, such as the user's hand (e.g., a glove). The trackable garment 540 may collect information about the portion of the user's body that can be used as input for virtual reality applications 572 executing on the console 570. The trackable garment 540 includes a haptic feedback mechanism 542, sensors 544, a communication interface 546, and GMR strain gauges 548. Some embodiments of the trackable garment 540 have different components than those described here, e.g., the trackable garment 540 may include additional components that are not shown in FIG. 5, such as a power source (e.g., an integrated battery, a connection to an external power source, a container containing compressed air, or some combination thereof) and one or more controllers (e.g., for controlling the GMR strain gauges 548). Similarly, the functions can be distributed among the components in a different manner than is described here.

The haptic feedback mechanism 542 provides haptic feedback to the user by directing the portion of the user's body to move in a particular way or in a particular direction or preventing the portion of the user's body from moving in certain directions or in certain ways. The haptic feedback mechanism 542 may include transducers for applying forces on portions of the user's body. By applying forces to the user's body, the haptic feedback mechanism 542 may move a portion of the user's body apply torque to a joint of a user's body, or produce tactile sensation for the user.

The sensors 544 include one or more hardware devices that detect spatial information for the trackable garment 540. Examples of sensors 544 include: one or more accelerometers, one or more gyroscopes, one or more magnetometers, another suitable type of sensor that detects motion, a type of sensor used for error correction, or some combination thereof. The sensors 544 may provide data to an inertial measurement unit (IMU), which is an electronic device that generates data indicating a position of the trackable garment 540 based on measurement signals received from one or more of the sensors 544. The sensors 544 may be located external to the IMU, internal to the IMU, or some combination thereof.

The spatial information detected by the sensors 544 and/or IMU may include information about position, orientation, velocity, rotation, and acceleration, or some combination thereof. The spatial information may refer to the entire trackable garment 540, subdivisions of the trackable garment 540, or both. For example, if the trackable garment 540 is a haptic glove, sensors 544 may identify positions and orientations of various portions of the glove, such as glove digits or portions of the glove digits corresponding to a wearer's fingertips or knuckles. The sensors 544 may also detect forces applied by the user to the trackable garment 540. The spatial information may supplement position information determined using the GMR strain gauges 548.

The communication interface 546 enables input from and output to the console 570. In some embodiments, the communication interface 546 may be a single communication bus, such as USB. In other embodiments, the communication interface 546 includes several distinct communication buses operating together or independently. For example, the communication interface 546 may include separate communication buses for receiving control signals for the haptic feedback mechanism 542 and sending data from the sensors 544 to the console 570. The one or more communication buses of the communication interface 546 may be implemented as wired connections, wireless connections, or some combination thereof.

The GMR strain gauges 548 are strain gauges based on the GMR effect that can be used to determine whether various positions along the trackable garment 540 are bent or not, and in some embodiments, to determine a degree of bending. For example, the GMR strain gauges 548 may be positioned at or near a user's knuckles or other hand joints to identify bends in the user's hand joints. The identified bends or degrees of bending can be compared to a model of the trackable garment 540 or the user's hand to determine an overall pose of the user's hand. The GMR strain gauges 548 may be any of the strain gauges described with respect to FIG. 1, 3, or 4. In some embodiments, a combination of the more than one of the strain gauges described with respect to FIGS. 1, 3, and 4 can be incorporated into the trackable garment 540.

The console 570 is a computing device that executes artificial reality applications. For example, the console 570 processes input data from the sensors 514 on the HMD 510 and the GMR strain gauges 548 on the trackable garment 540 and, based on the input, provides output data for the electronic display 512 on the HMD 510 and the haptic feedback mechanism 542 on the trackable garment 540. In some embodiments, the console 570 also processes input data from the sensors 544 on the trackable garment 540. The console 570, or portions thereof, may be integrated with the HMD 510, the trackable garment 540, or both the HMD 510 and the trackable garment 540. For example, in some embodiments, the HMD 510 includes the console 570 in its entirety. The console 570 can be implemented as any kind of computing device, such as an integrated system-on-a-chip, a microcontroller, a desktop or laptop computer, a server computer, part of a HMD, a tablet, a smart phone, or other mobile device. Thus, the console 570 may include components common to typical computing devices, such as a processor, random access memory (RAM), a storage device, a network interface, an I/O interface, and the like.

The processor may be or include one or more graphics processing units (GPUs), microprocessors, or application specific integrated circuits (ASICs). The memory may be or include RAM, ROM, DRAM, SRAM, and MRAM, and may include firmware, such as static data or fixed instructions, BIOS, system functions, configuration data, and other routines used during the operation of the computing device and the processor. The memory also provides a storage area for data and instructions associated with applications and data handled by the processor.

The storage device provides non-volatile, bulk, or long term storage of data or instructions in the computing device. The storage device may take the form of a magnetic or solid state disk, tape, CD, DVD, or other reasonably high capacity addressable or serial storage medium. Multiple storage devices may be provided or be available to the computing device. Some of these storage devices may be external to the computing device, such as network storage or cloud-based storage. The network interface includes an interface to a network and can be implemented as either a wired or wireless interface. The I/O interface interfaces the processor to peripherals (not shown) such as, depending upon the computing device, sensors, displays, cameras, color sensors, microphones, keyboards and USB devices.

In the example shown in FIG. 5, the console 570 further includes applications 572 and an engine 574. An application 572 running on the engine 574 may generate an artificial reality environment. In some embodiments, the applications 572 and the engine 574 are implemented as software modules that are stored on the storage device and executed by the processor. Some embodiments of the console 570 include additional or different components than those described in conjunction with FIG. 5. Similarly, the functions further described below may be distributed among components of the console 570 in a different manner than is described here.

Each application 572 is a group of instructions that, when executed by a processor, generates virtual reality content for presentation to the user. An application 572 may generate content (e.g., artificial reality content) in response to inputs received from the user via movement of the HMD 510 or the trackable garment 540. Examples of applications 572 include gaming applications, conferencing applications, video playback applications, augmented reality application, telerobotic applications, or other suitable applications.

The engine 574 is a software module that allows the applications 572 to operate in conjunction with the HMD 510 and the trackable garment 540. In some embodiments, the engine 574 receives information from sensors 514 on the HMD 510 and provides the information to an application 572. Based on the received information, the engine 574 determines media content to provide to the HMD 510 for presentation to the user via the electronic display 512 or haptic feedback to provide to the trackable garment 540 to provide to the user via the haptic feedback mechanism. For example, if the engine 574 receives information from the sensors 514 on the HMD 510 indicating that the user has looked to the left, the engine 574 generates content for the HMD 510 that mirrors the user's movement in a virtual environment.

In some embodiments, the engine 574 receives position information from the GMR strain gauges 548 and/or the sensors 544 and provides the information to an application 572. The application 572 can use the information to perform an action within the virtual world of the application 572. For example, if the engine 574 receives information from the sensors 544 and GMR strain gauges 548 that the user has positioned her hand at a position corresponding to a virtual coffee mug in a virtual environment, bent her fingers in a gripping gesture, and raised her hand with the bent fingers to a higher position, a simulated hand in the application 572 picks up the virtual coffee mug and lifts it to a corresponding height.

The engine 574 may also provide feedback to the user that the action was performed. The provided feedback may be visual via the electronic display 512 in the HMD 510 (e.g., displaying the simulated hand as it picks up and lifts the virtual coffee mug) or haptic feedback via the haptic feedback mechanism 542 in the trackable garment 540 (e.g., resisting movement of a user's fingers from curling past a certain point to simulate the sensation of touching a solid coffee mug). The haptic feedback may also be force feedback from some machine being controlled by the user.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A strain gauge system comprising:
a layered structure, the layered structure having an unstretched position and a range of stretched positions, the layered structure comprising:
a multilayer thin film comprising alternating layers of ferromagnetic and non-ferromagnetic materials, the alternating layers including a first layer of ferromagnetic material, a second layer of ferromagnetic material, and a first layer of non-ferromagnetic material that is between the first layer of ferromagnetic material and the second layer of ferromagnetic material;
a flexible magnet that produces a magnetic field, the flexible magnet in contact with the first layer of ferromagnetic material; and
a resistance sensor for measuring a resistance of the multilayer thin film, the resistance of the multilayer thin film being lower when the layered structure is in the unstretched position than a stretched position in the range of stretched positions,
wherein, in the unstretched position, the magnetic field causes parallel alignment of magnetizations of the first layer of ferromagnetic material and the second layer of ferromagnetic material, and in the stretched position the magnetic field causes anti-parallel alignment between magnetizations of the first layer of ferromagnetic material and the second layer of ferromagnetic material.

2. The strain gauge system of claim 1, wherein the magnetic field produced by the flexible magnet has a first field strength within the layered structure in the unstretched position and a second field strength within the layered structure in the stretched position, the first field strength higher than the second field strength.

3. The strain gauge system of claim 2, wherein the first field strength of the flexible magnet in the unstretched position causes parallel alignment of a magnetization of the layers of ferromagnetic materials, and the second field strength of the flexible magnet in the stretched position causes antiparallel alignment of the magnetization of the layers of ferromagnetic materials.

4. The strain gauge system of claim 1, further comprising a wearable garment configured to be worn by a user, the layered structure positioned on the wearable garment at a position corresponding to a joint of the user, and the range of stretched positions corresponds to a range of bending of the joint.

5. The strain gauge system of claim 4, wherein the resistance of the multilayer thin film varies over the range of stretched positions, and the measurement of the resistance of the multilayer thin film is used to determine a degree of bending in the joint of the user.

6. The strain gauge system of claim 4, the layered structure further comprising a flexible substrate, wherein the multilayer thin film is positioned atop the flexible substrate, and the flexible magnet is positioned atop the multilayer thin film.

7. The strain gauge system of claim 6, wherein the layered structure in the unstretched position is substantially planar, and the multilayer thin film is substantially planar and is oriented within the same plane as the layered structure.

8. The strain gauge system of claim 1, wherein the layers of ferromagnetic material comprise layers of permalloy, and the layers of non-ferromagnetic materials comprise layers of copper.

9. A strain gauge system comprising:
a stretchable structure comprising:
a multilayer thin film comprising alternating layers of ferromagnetic and non-ferromagnetic materials, the alternating layers including a first layer of ferromagnetic material, a second layer of ferromagnetic material, and a first layer of non-ferromagnetic material that is between the first layer of ferromagnetic material and the second layer of ferromagnetic material; and
a magnet that produces a magnetic field, the magnet in contact with the first layer of ferromagnetic material and the magnetic field having a first field strength within the multilayer thin film in an unstretched position of the stretchable structure, and the magnetic field having a second field strength within the multilayer thin film in a stretched position of the stretchable structure, the second field strength being lower than the first field strength, wherein, in the unstretched position, the magnetic field having the first field strength causes parallel alignment of magnetizations of the first layer of ferromagnetic material and the second layer of ferromagnetic material, and in the stretched position the magnetic field having the second field strength causes anti-parallel alignment between magnetizations of the first layer of ferromagnetic material and the second layer of ferromagnetic material; and
a resistance sensor for measuring a resistance of the multilayer thin film, the resistance of the multilayer thin film being related to a field strength of the magnetic field within the multilayer thin film.

10. The strain gauge system of claim 9, wherein the multilayer thin film is aligned with the magnet in the unstretched position of the stretchable structure, and the multilayer thin film is unaligned with the magnet in the stretched position of the stretchable structure.

11. The strain gauge system of claim 9, the stretchable structure further comprising a flexible material in which the multilayer thin film and the magnet are embedded.

12. The strain gauge system of claim 11, wherein the stretchable structure in the unstretched position is substantially planar, and the multilayer thin film and the magnet are embedded in the flexible material with an orientation perpendicular to the plane of the stretchable structure, and the multilayer thin film and the magnet are oriented parallel to each other.

13. The strain gauge system of claim 11, wherein, in the unstretched position of the stretchable structure, the multilayer thin film and the magnet are a first distance apart, and in the stretched position of the stretchable structure, the multilayer thin film and the magnet are a second distance apart, the second distance longer than the first distance.

14. The strain gauge of claim 9, the stretchable structure further comprising a first flexible material in which the multilayer thin film is embedded, and a second flexible material in which the magnet is embedded, the second flexible material layered above the first flexible material embedded, and the second flexible material having a different elasticity than the first flexible material.

15. The strain gauge of claim 14, wherein, in the unstretched position of the stretchable structure, the multilayer thin film and the magnet are aligned with the magnet positioned above the multilayer thin film, and in the stretched position of the stretchable structure, the multilayer thin film and the magnet are unaligned with the magnet offset from the multilayer thin film.

16. The strain gauge system of claim 9, wherein the magnetic field having the first field strength within the multilayer thin film causes parallel alignment of a magnetization of the layers of ferromagnetic materials, and the magnetic field having the second field strength within the multilayer thin film causes antiparallel alignment of the magnetization of the layers of ferromagnetic materials.

17. The strain gauge system of claim 9, further comprising a garment configured to be worn by a user, the stretchable structure positioned on the garment at a position corresponding to a joint of the user, and the stretched position corresponds to a bend in the joint.

18. The strain gauge system of claim 17, wherein the stretchable structure has a range of stretched positions, the resistance of the multilayer thin film varies over the range of stretched positions, and the measurement of the resistance of the multilayer thin film is used to determine a degree of bending in the joint of the user.

19. The strain gauge system of claim 9, further comprising a wearable glove configured to be worn by a user, and the strain gauge system measures an amount of bend of a glove digit of the wearable glove.

20. The strain gauge system of claim 9, wherein the layers of ferromagnetic material comprise layers of permalloy, and the layers of non-ferromagnetic materials comprise layers of copper.

* * * * *

UNITED STATES PATENT AND TRADEMARK OFFICE
CERTIFICATE OF CORRECTION

PATENT NO. : 10,845,212 B1  
APPLICATION NO. : 15/868859  
DATED : November 24, 2020  
INVENTOR(S) : Turkyilmaz et al.

Page 1 of 1

It is certified that error appears in the above-identified patent and that said Letters Patent is hereby corrected as shown below:

In the Claims

Column 16, Claim 14, Line 54, after "gauge" insert -- system --.

Column 16, Claim 15, Line 61, after "gauge" insert -- system --.

Signed and Sealed this  
Twentieth Day of April, 2021

Drew Hirshfeld  
*Performing the Functions and Duties of the*  
*Under Secretary of Commerce for Intellectual Property and*  
*Director of the United States Patent and Trademark Office*